(12) United States Patent
Yamasaki et al.

(10) Patent No.: US 10,871,505 B2
(45) Date of Patent: Dec. 22, 2020

(54) DATA PROCESSING DEVICE FOR SCANNING PROBE MICROSCOPE

(71) Applicant: SHIMADZU CORPORATION, Kyoto-shi, Kyoto (JP)

(72) Inventors: Kenji Yamasaki, Kyoto (JP); Akinori Kogure, Kyoto (JP)

(73) Assignee: SHIMADZIJ CORPORATION, Kyoto (JP)

( * ) Notice: Subject to any disclaimer, the term of this patent is extended or adjusted under 35 U.S.C. 154(b) by 130 days.

(21) Appl. No.: 16/312,729

(22) PCT Filed: Jun. 24, 2016

(86) PCT No.: PCT/JP2016/068919
§ 371 (c)(1),
(2) Date: Dec. 21, 2018

(87) PCT Pub. No.: WO2017/221423
PCT Pub. Date: Dec. 28, 2017

(65) Prior Publication Data
US 2019/0383855 A1   Dec. 19, 2019

(51) Int. Cl.
*G01Q 60/38* (2010.01)
*G01B 9/04* (2006.01)
*G01Q 70/08* (2010.01)

(52) U.S. Cl.
CPC ............... *G01Q 60/38* (2013.01); *G01B 9/04* (2013.01); *G01Q 70/08* (2013.01)

(58) Field of Classification Search
CPC .......... G01Q 60/38; G01Q 70/08; G01B 9/04
See application file for complete search history.

(56) References Cited

FOREIGN PATENT DOCUMENTS

JP    2005-283433 A    10/2005

OTHER PUBLICATIONS

Written Opinion dated Sep. 6, 2016 in application No. PCT/JP2016/068919.

*Primary Examiner* — Nicole M Ippolito
*Assistant Examiner* — Hanway Chang
(74) *Attorney, Agent, or Firm* — Sughrue Mion, PLLC

(57) ABSTRACT

A data processing device for a scanning probe microscope, the data processing device processing biaxial data indicating a change in a second physical quantity with respect to a change in a first physical quantity, the biaxial data being acquired for each of a plurality of measurement points on a sample surface by scanning the sample surface with a probe using a scanning probe microscope, the data processing device includes: a feature amount calculator 41 that acquires one or a plurality of types of feature amounts from the biaxial data at each measurement point; a feature amount selector 42 that causes a user to select one of the one or the plurality of types of feature amounts; a two-dimensional mapping image display unit 43 that displays the feature amount on a screen as a two-dimensional mapping image with each measurement point as one pixel based on selection of the feature amount by the user; and a biaxial data display unit 44 that, when the user selects one of the pixels in the two-dimensional mapping image, displays on the screen the selected pixel and the biaxial data of the measurement point corresponding to one or a plurality of pixels adjacent to the selected pixel.

4 Claims, 4 Drawing Sheets

DATA PROCESSING DEVICE FOR SCANNING PROBE MICROSCOPE

CROSS REFERENCE TO RELATED APPLICATIONS

This application is a National Stage of International Application No. PCT/KR2016/068919, filed on Jun. 24, 2016.

TECHNICAL FIELD

The present invention relates to a data processing device for a scanning probe microscope used to analyze measurement data of interaction acting between a probe and a sample surface at a plurality of measurement points on the sample surface, the measurement data of interaction being obtained while the sample surface is scanned with the probe in a scanning probe microscope. The present invention particularly relates to a device that analyzes biaxial data, such as a force curve, which represents a change in a second physical quantity with respect to a change in a first physical quantity.

BACKGROUND ART

In a scanning probe microscope (SPM), a tip of a minute probe is brought close to the sample surface, and data relating to mechanical interaction or electromagnetic interaction between the probe and the sample is acquired while the sample surface is scanned with the probe. The acquired data is taken into a data processing device for a scanning probe microscope, and used to analyze a shape of the sample surface and a distribution of an electrical characteristic.

One of pieces of data obtained by the scanning probe microscope is called the force curve (FIG. 1). The force curve is data acquired at each of the plurality of measurement points on the sample surface, and includes an approach line for acquiring the data while bringing the probe close to the sample surface and a release line for acquiring the data while moving the probe away from the sample surface.

The approach line and the release line will be described below.

In acquiring the data of the approach line, a base of a cantilever that is an elastic support is brought close to the sample surface from a state in which the probe attached onto a tip side of the cantilever is positioned vertically above the measurement point on the sample surface. At this point, the base side of the cantilever may be lowered, or the sample may be raised. Force acting between the tip of the probe and the sample surface is almost zero while the sample surface and the tip of the probe are separated from each other to some extent. When the tip of the probe is brought close to the sample surface, van der Waals force acts between the tip of the probe and the sample surface, so that the tip of the probe is attracted to the sample surface. Consequently, the tip side of the cantilever is bent so as to be lowered. The bending is measured as a negative displacement amount in the vertical direction on the tip side of the cantilever. As the base of the cantilever is brought closer to the sample surface from this state, the tip side of the cantilever is bent so as to be raised when and while the tip of the probe is in contact with the sample surface, and the displacement amount changes to a positive value. The operation to bring the base of the cantilever closer to the sample surface is stopped when the displacement amount reaches a predetermined positive value. The approach line (a solid line in FIG. 1) represents a series of changes in the displacement amount of the tip side of the cantilever with respect to a distance between the sample surface and the base of the cantilever, and the data of the approach line is acquired from the right side to the left side in FIG. 1.

When the base is moved away from the sample surface after the approach line is acquired in the described way, the bending of the cantilever is gradually eliminated, and the displacement amount on the tip side is also brought close to zero. Even after the displacement amount reaches zero, the state in which the tip of the probe adheres to the sample surface is maintained for a while due to adsorption force of the sample surface, so that the tip of the cantilever is bent so as to be lowered to turn the displacement amount to a negative value. As the base of the cantilever is further moved away from the sample surface, elastic restoring force of the cantilever exceeds the adsorption force of the sample surface, and the tip of the probe is separated from the sample surface to return the displacement amount to zero. The release line (a broken line in FIG. 1) represents a series of changes in the displacement amount on the tip side of the cantilever with respect to the distance between the sample surface and the base of the cantilever, and the data is acquired from the left side to the right side in FIG. 1.

The data of the force curve (approach line and release line) obtained in the described way is sent to the data processing device for a scanning probe microscope. In the data processing device, for example, a minimum value of the displacement amount on the tip side of the cantilever and a gradient (of a line segment in which a point at which the displacement amount reaches the predetermined positive value is set to one of ends) of the force curve are obtained as a feature amount of the force curve from the distance between the sample surface and the base of the cantilever when the displacement amount reaches the predetermined positive value. Information about the adsorption force of the sample surface, information about irregularities (height) on the sample surface, and information about hardness of the sample surface are obtained from these feature amounts. In the data processing device, a two-dimensional mapping image of the sample surface is created with one measurement point as one pixel from the obtained feature amount at each measurement point.

The obtained two-dimensional mapping image is displayed on an analysis screen for analyzing the sample surface as shown in FIG. 2, for example. The two-dimensional mapping image of the sample surface created using the feature amount selected by a user from the above plurality of types of feature amounts is displayed on the left side of the analysis screen. When the user sees the two-dimensional mapping image, and selects a pixel (measurement point) in which the detailed force curve is desired to be checked on the two-dimensional mapping image by a clicking operation, the force curve acquired at the measurement point is displayed on the right side of the analysis screen.

CITATION LIST

Patent Literature

Patent Literature 1, JP 2005-283433 A

SUMMARY OF INVENTION

Technical Problem

If a composition of a substance changes across a boundary on the sample surface, the shape of the force curve changes largely between the measurement points across the boundary. A region ("region of interest") where a detailed analysis is needed can be decided by checking the change in the shape of the force curve. However, the conventional data processing device for a scanning probe microscope had to check the force curves at the measurement points one by one, and had a problem that the change in the shape of the force curve was difficult to be grasped.

The case where the force curve at each measurement point is shown so far as an example, and a similar problem is generated for various pieces of biaxial data (such as an I-V curve indicating a change in a voltage value with respect to an amount of electric current passing through the probe, and an F-V curve indicating the change in the voltage value with respect to magnitude of the force applied to the measuring point on the sample surface from the probe) indicating the change in the second physical quantity with respect to the change in the first physical quantity.

In order to solve the above problems, an object of the present invention is to provide a data processing device that facilitates a user to grasp the change in the shape of biaxial data between the measurement points in the two-dimensional mapping data produced from the biaxial data acquired with the scanning probe microscope.

Solution to Problem

The present invention aimed at solving the above problems is a data processing device for a scanning probe microscope, the data processing device processing biaxial data indicating a change in a second physical quantity with respect to a change in a first physical quantity, the biaxial data being acquired for each of a plurality of measurement points on a sample surface by scanning the sample surface with a probe using a scanning probe microscope, the data processing device comprising:

a) a feature amount calculator that acquires one or a plurality of types of feature amounts from the biaxial data at each of the plurality of measurement points;

b) a feature amount selector that allows a user to select one of the one or the plurality of types of feature amounts;

c) a two-dimensional mapping image display unit that displays the feature amount at each of the plurality of measurement points on a screen as a two-dimensional mapping image with each measurement point as one pixel based on selection of the feature amount by the user; and d) a biaxial data display unit that, when the user selects one of the pixels in the two-dimensional mapping image, displays on the screen the biaxial data of the measurement points corresponding to the selected pixel and one or a plurality of pixels adjacent to the selected pixel.

The biaxial data indicating the change in the second physical quantity with respect to the change in the first physical quantity means, for example, the force curve indicating the change in the interatomic force with respect to the distance between the sample surface and the tip of the probe, the I-V curve indicating the change in the voltage value with respect to the amount of electrical current passing through the probe, and the F-V curve indicating the change in the voltage value with respect to the magnitude of force applied from the probe to the measuring point on the sample surface. In the case where the biaxial data is the a force curve, for example, the feature amount may be the minimum value of the displacement amount at the tip of the cantilever, the distance between the sample surface and the base of the cantilever when the displacement amount reaches the predetermined positive value, or the gradient of the force curve.

The measurement point at which the biaxial data display unit displays the biaxial data on the screen is preferably a measurement point corresponding to a pixel located within a predetermined range centered on the pixel selected by the user. For example, the measurement point can be set to 3 points×3 points or 5 points×5 points with the selected pixel (measurement point) as the center.

In the data processing device for a scanning probe microscope according to the present invention, when the user selects one pixel in the two-dimensional mapping image, the biaxial data of one or a plurality of pixels (measurement points) adjacent to the pixel is also simultaneously displayed on the screen. For example, the biaxial data of 9 points are displayed on the screen by the one-time screen selection operation by the user in the case where the biaxial data display unit displays the measurement points of 3 points×3 points, and the biaxial data of 25 points are displayed on the screen by the one-time screen selection operation by the user in the case where the biaxial data display unit displays the measurement points of 5 points×5 points, so that the change in the shape of the biaxial data between the measurement points can easily be grasped.

The data processing device for a scanning probe microscope according to the present invention may further include e) a magnification display unit that, when the user selects one or a plurality of biaxial data displayed on the screen, magnifies and displays the selected biaxial data.

The use of the data processing device for a scanning probe microscope according to an aspect including the magnification display unit allows the user to magnify and display only the desired biaxial data on the screen, and is useful for detailed analysis of the biaxial data or comparison between the desired biaxial data.

In the data processor for a scanning probe microscope according to the present invention, when the user selects a plurality of biaxial data, the position corresponding to each of the selected plurality of biaxial data is preferably displayed on the two-dimensional mapping image. Owing to this configuration, it is possible to easily discriminate at which measurement point each biaxial data is acquired.

The data processing device for a scanning probe microscope according to the present invention may further include f) a two-dimensional data display unit that, when the user selects two pixels in the two-dimensional mapping image, produces data in which a value of the second physical quantities are represented within a two-dimensional area in a visually distinguishable manner, in which one axis is defined as a position on the line segment connecting two points of the selected two pixels and another one axis is defined as a value of the first physical quantity, and displays the two-dimensional data on the screen with a position on the line segment connecting two points of the selected two pixels as one axis.

The use of the data processing device for a scanning probe microscope according to an aspect including the two-dimensional data display unit can easily grasp the change in the biaxial data with respect to the position on the line segment connecting the two pixels (measurement points) selected by the user.

Advantageous Effects of Invention

The change in the shape of biaxial data between the measurement points can easily be grasped using the data processing device for a scanning probe microscope according to the present invention.

DESCRIPTION OF EMBODIMENTS

An embodiment of a data processing device for a scanning probe microscope according to the present invention will be described below with reference to the drawings.

Figure 1:
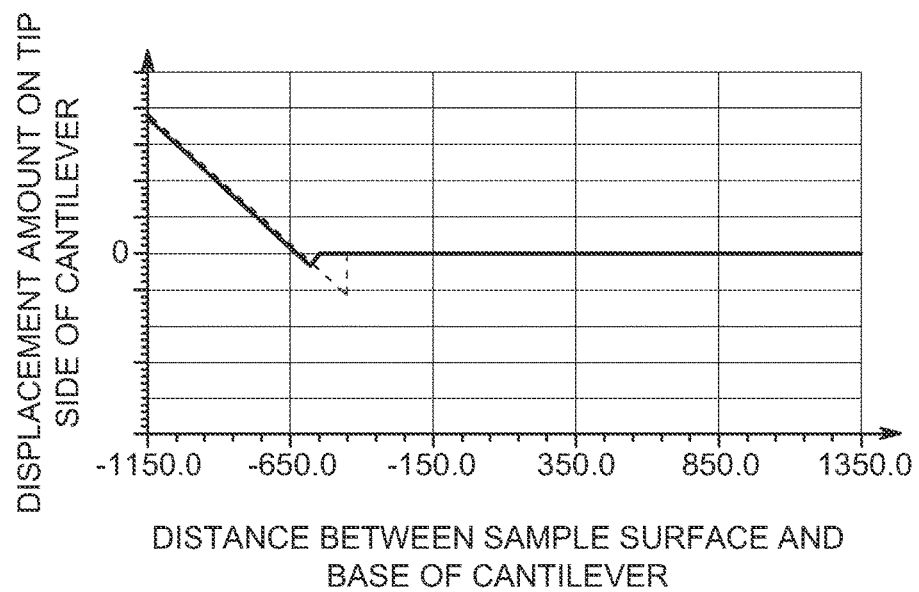
FIG. 1 illustrates an example of a force curve obtained by measurement using a scanning probe microscope.
Figure 2:
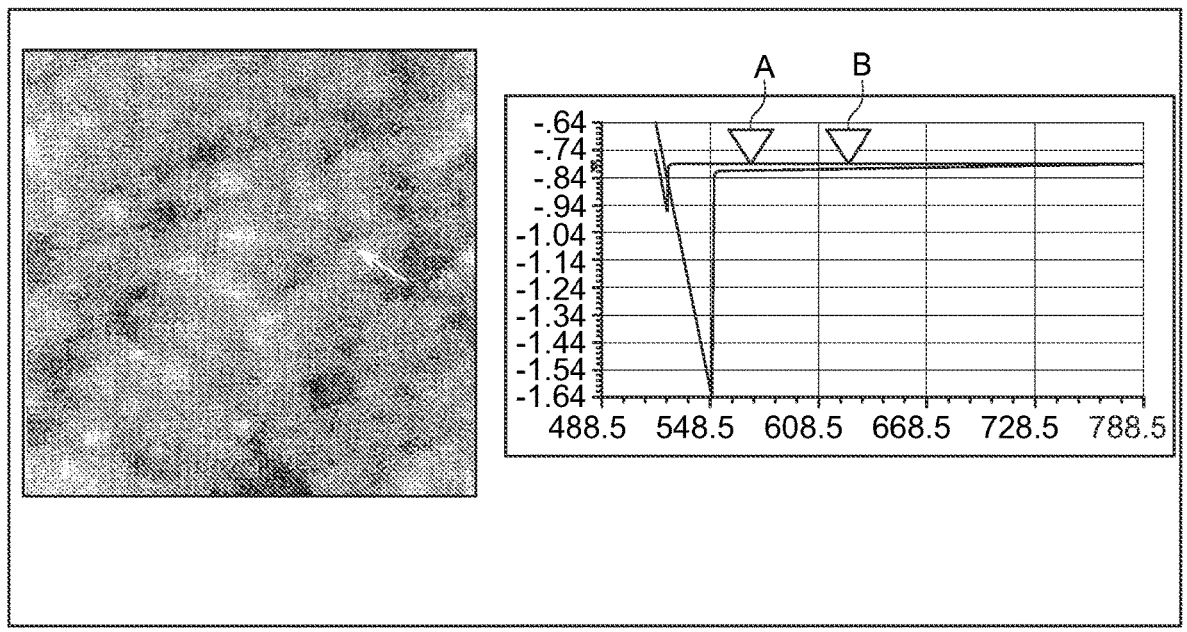
FIG. 2 illustrates an example of an analysis screen in a conventional data processing device for a scanning probe microscope.
Figure 3:
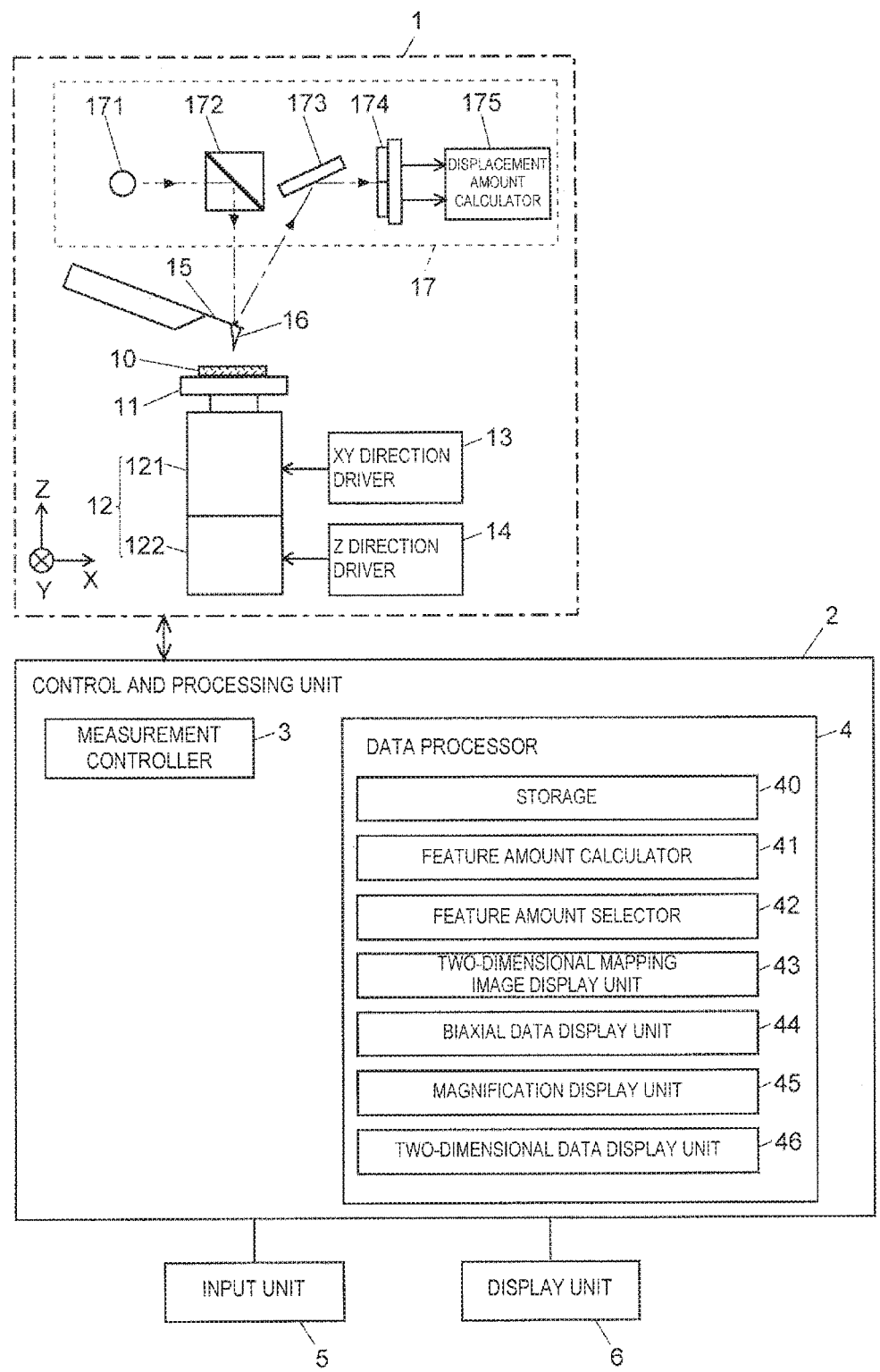
FIG. 3 is a configuration diagram illustrating a main part of a scanning probe microscope including one embodiment of a data processing device for a scanning probe microscope according to the present invention.

FIG. 3 is a configuration diagram illustrating a main part of a scanning probe microscope including the data processing device for a scanning probe microscope of the present embodiment. The scanning probe microscope includes a measurement unit 1 and a control and processing unit 2. The control and processing unit 2 includes a measurement controller 3 and a data processor 4. An entity of the control and processing unit 2 is a personal computer having the configuration and functional blocks which are to be described later. The input unit 5 and the display unit 6 are connected to the control and processing unit 2.

The data processor 4 corresponds to the data processing device for a scanning probe microscope according to the present invention.

In the measurement unit 1, a sample 10 to be measured is placed on a sample table 11 provided on a scanner 12. The scanner 12 includes an X-Y scanner 121 that moves the sample table 11 in X-axis direction and in Y-axis direction, where X-axis and Y-axis are orthogonal to each other in the horizontal plane. Z scanner 122 that finely moves the sample table 11 in Z-axis direction (vertical direction) orthogonal to the X axis and the Y axis. Each of the X-Y scanner 121 and the Z scanner 122 is driven by a piezoelectric element (not illustrated) that operates based on a control signal from the measurement controller 3.

A flexible cantilever 15 having a probe 16 at a tip of the cantilever 15 is disposed above the sample 10 (in this embodiment, the cantilever 15 is positioned apart from the sample 10 in the Z-axis direction). In order to detect a displacement in the Z-axis direction of the cantilever 15, an optical displacement detector 17 including a laser beam source 171, a half mirror 172, a mirror 173, a photodetector 174, and a displacement amount calculator 175 is provided above the cantilever 15. In the optical displacement detector 17, a laser beam emitted from the laser beam source 171 is reflected substantially vertically downward by the half mirror 172, and a reflection surface provided at the tip on a back surface of the cantilever 15 is irradiated with the laser beam. The light reflected by the reflection surface is incident on the photodetector 174 by way of the mirror 173. For example, the photodetector 174 is a quadrant photodetector having four light receiving areas divided in the Z-axis direction and the Y-axis direction. An amount of light incident on each of the plurality of light receiving areas changes when the cantilever 15 is displaced in the Z-axis direction. The displacement amount calculator 175 calculates a displacement amount (deflection amount) at the tip of the cantilever 15 by performing arithmetic processing on a detection signal corresponding to the amount of light in each of the plurality of light receiving areas.

The measurement controller 3 mainly controls a measurement operation of the measurement unit 1, drives the scanner 12 to scan the surface of the sample 10 with the cantilever 15 based on various measurement conditions input by a user, and acquires data of a force curve including the approach line and the release line at each measurement point on the surface of the sample 10. The data obtained by the measurement is stored in a storage 40 of a data processor 4. In the present embodiment, the measurement is performed to acquire the force curve at each measurement point on the surface of the sample 10. In the scanning probe microscope of the present embodiment, various measurement modes such as a contact mode and a dynamic mode can be performed in addition to the measurement of the force curve. The method for performing each measurement is similar to the conventional method, so that the detailed description of measurement will be omitted.

In addition to the storage 40, the data processor 4 further includes, as the functional blocks, a feature amount calculator 41, a feature amount selector 42, a two-dimensional mapping image display unit 43, a biaxial data display unit 44, a magnification display unit 45, and a two-dimensional data display unit 46. A CPU of a computer constituting the control and processing unit 2 executes a data processing program to implement these functional blocks.

Measurement data processing performed by the data processor 4, which is a characteristic operation in the scanning probe microscope of the present embodiment, will be described in detail below. The data of the force curve at each measurement point on the surface of the sample 10 obtained by the above measurement is previously stored in the storage 40.

When the user issues an instruction to start the analysis of the sample 10, the force curve data obtained for the sample 10 is read from the storage 40. The feature amount selector 42 urges the user to select a type of the feature amount through the display unit 6. Specifically, the user is urged to select, as the feature amount, one of the minimum value of the displacement amount at the tip of the cantilever (a negative value having the maximum absolute value), the distance between the sample surface and the base of the cantilever when the displacement amount of the cantilever reaches a predetermined maximum value, and the gradient of the force curve. The information about the adsorption force of the sample surface is acquired from the minimum value of the displacement amount on the tip side of the cantilever, the information about the irregularities (height) of the sample surface is acquired from the distance between the sample surface and the base of the cantilever when the displacement amount reaches a predetermined positive value, and the information about hardness of the sample surface is acquired from the gradient (of the line segment in which the point at which the displacement amount of the cantilever reaches a predetermined maximum value is set to one of ends) of the force curve. The user is urged to additionally select whether the feature amount is acquired from the approach line or the release line as necessary. For example, the approach line is different from the release line in the minimum value of the displacement amount on the tip side of the cantilever, so that the user is caused to select whether the feature amount is acquired from the approach line or the release line in the case where the minimum value of the displacement amount is selected as the feature amount.

The case where the user selects, as the feature amount, the distance between the sample surface and the base of the cantilever when the displacement amount of the cantilever reaches the predetermined maximum value will be described below as an example. The same holds true for the data processing operation in the case where another feature amount is selected. The feature amount is common to the approach line and release line, so that the above additional selection is not performed.

When the user performs the above selection, the feature amount calculator 41 calculates the feature amount (the distance between the sample surface and the base of the cantilever when the displacement amount of the cantilever reaches the predetermined maximum value) selected by the user at each measurement point on the surface of the sample 10. The two-dimensional mapping image display unit 43 creates the two-dimensional mapping image in which the value of the feature amount is represented by a color difference with the measurement point as one pixel, and displays the two-dimensional mapping image on the left region of the analysis screen of the display unit 6. The two-dimensional mapping image is an image indicating the state of irregularities on the surface of the sample 10. In the present embodiment, the feature amount is acquired after the user selects the type of the feature amount. Alternatively, the user may select the type of the feature amount after the feature amount calculator 41 acquires all types of computable feature amounts.

Figure 4:
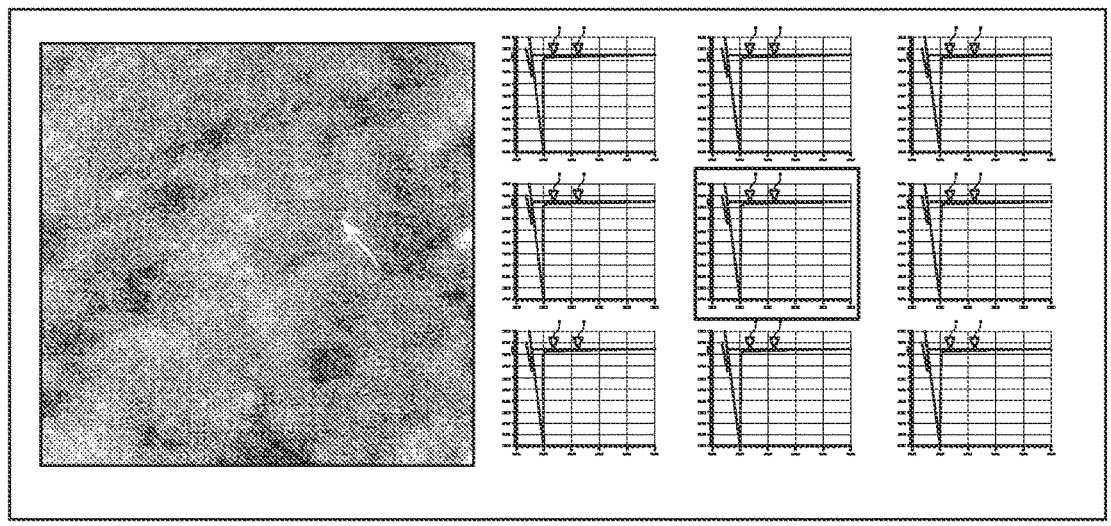
FIG. 4 illustrates an example of an analysis screen in the present embodiment.

When the user operates an input unit (mouse) to place a mouse cursor on the two-dimensional mapping image displayed on the analysis screen, as illustrated in FIG. 4, the force curve of 3×3 pixels (measurement points) including pixels (measurement points) adjacent to a center pixel (measurement point) is previewed in the right region of the two-dimensional mapping image, where the center pixel is a pixel on which the mouse cursor is placed. In FIG. 4, the force curve surrounded by the solid line corresponds to the pixel (measurement point) at the position where the mouse cursor is placed, and other force curves except for the force curve surrounded by the solid line correspond to the adjacent pixels (measurement points). In the present embodiment, the preview is performed in the right region of the two-dimensional mapping image. However, the display position is not limited to this configuration, but the preview may be performed so as to overlap the two-dimensional mapping image. The number of force curves to be displayed is not limited to 9 in total of 3×3 pixels, but may be 25 in total of 5×5 pixels, 5 in total including 4 pixels adjacent in the upper, lower, left, and right, or 2 in total including one pixel adjacent in a predetermined direction.

As described above, in the present embodiment, when the user moves the cursor onto one pixel (measurement point) in the two-dimensional mapping image, the biaxial data of one or a plurality of pixels (measurement points) adjacent to the one pixel (measurement point) are previewed on the analysis screen with the biaxial data of the one pixel. In the example of FIG. 4, the force curves at the nine measurement points are previewed on the analysis screen, so that the user can easily grasp the change of the shape of the biaxial data between the adjacent measurement points.

When the user designates one pixel by a mouse click operation while the screen in FIG. 4 is displayed, the magnification display unit 45 magnifies and displays a peripheral portion of the pixel where the mouse cursor is located in the two-dimensional mapping image. A checkbox is additionally displayed in each of the previewed nine force curves. The user checks and selects the checkbox of the force curve to be checked in detail from the nine force curves, and fixes the selection operation (for example, an operation to press an "OK" button displayed on the screen), whereby the magnification display unit 45 magnifies and displays the selected force curve. A scroll bar is displayed below the magnified and displayed two-dimensional mapping image, and the user can appropriately change a degree of magnification and reduction of the two-dimensional mapping image by moving the scroll bar.

Figure 5:
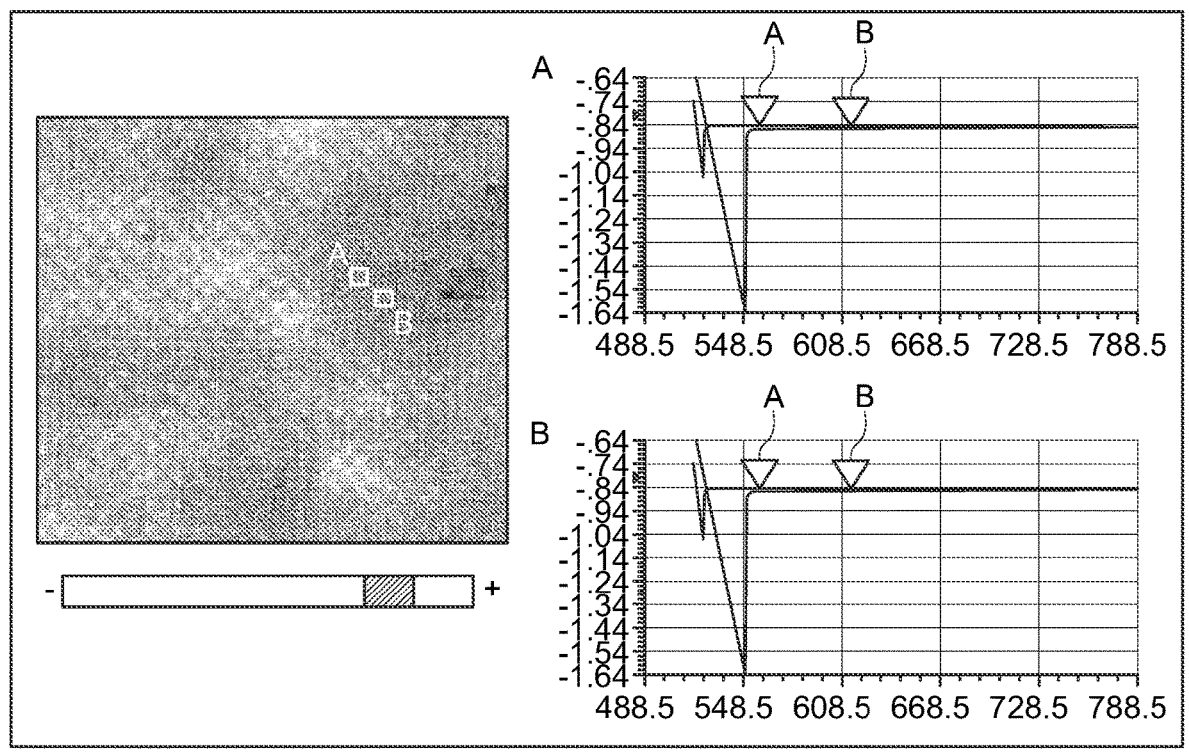
FIG. 5 illustrates another example of the analysis screen in the present embodiment.

At this point, when the user selects the plurality of force curves (in this case, two), the magnification display unit 45 adds signs (A, B) to the selected two force curves as illustrated in FIG. 5, and also displays signs (A, B) to the corresponding pixel position on the two-dimensional mapping image. Consequently, the user can easily discriminate which pixel (measurement point) the selected force curve belongs to.

Figure 6:
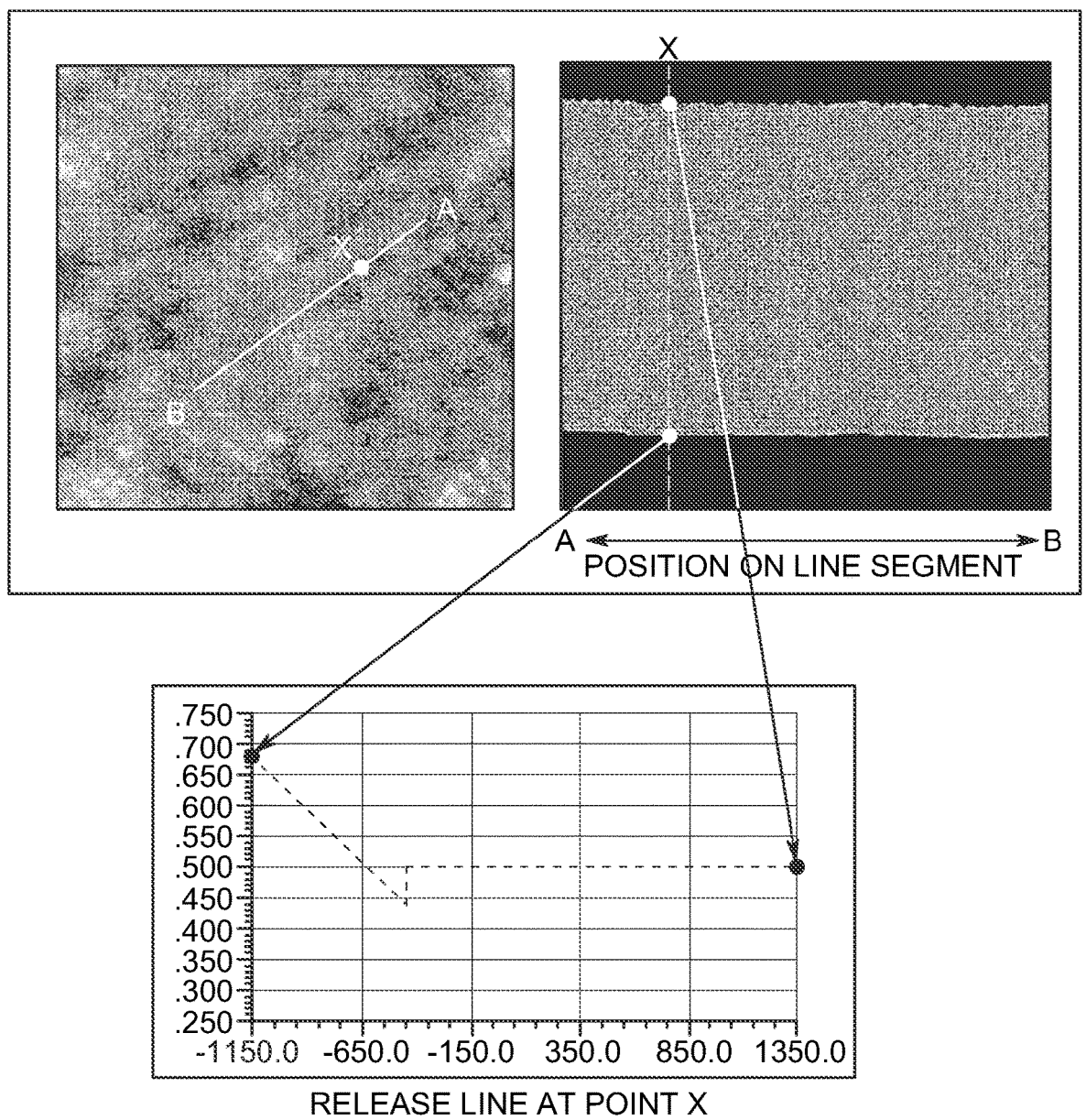
FIG. 6 illustrates still another example of the analysis screen in the present embodiment.

When a predetermined operation (for example, an operation to click the mouse at the point A and to cancel the click at the point B while maintaining the click state) to select two pixels (measurement points) on the two-dimensional mapping image is performed, the two-dimensional data display unit 46 displays a line segment connecting the selected point A and the selected point B on the two-dimensional mapping image. Then, when the user performs an operation (for example, an operation to press the "OK" button displayed on the screen) to fix the line segment, the two-dimensional data display unit 46 displays a drawing in FIG. 6 in the right region of the analysis screen. In FIG. 6, the force curves at measurement points located on a line segment A-B are arranged in the horizontal direction. That is, the horizontal axis corresponds to the position on the line segment, and the upper end and the lower end in the vertical axis direction correspond to the left end and the right end of the force curve (see a lower part in FIG. 6). By viewing this display, the user can easily check the change of the shape or the value of the force curve (the approach line or the release line) on the line segment A-B. The irregularities of the sample surface can be checked from h shape of the upper end of the drawing. Although FIG. 6 is a monochrome drawing, the actually-displayed line segment is colored according to the value (the displacement amount at the tip of the cantilever) of the vertical axis of the force curve.

The above embodiment is merely an example, and can appropriately be changed according to the spirit of the present invention.

In the above embodiment, the force curve is displayed on the analysis screen. Alternatively, the force curve may be configured to indicate various biaxial data (the data indicating the change in the second physical quantity with respect to the change in the first physical quantity). For example, this configuration can suitably be used for displaying the I-V curve indicating the change in the voltage value with respect to the amount of current flowing through the probe, and the F-V curve indicating the change in the voltage value with respect to the magnitude of the force applied to the measurement point on the sample surface from the probe.

In the above embodiment, by way of example, the data processing device for a scanning probe microscope is included as a part of the scanning probe microscope. Alternatively, the data processing device for a scanning probe microscope according to the present invention may be formed separately from a scanning probe microscope main body.

REFERENCE SIGNS LIST

1 . . . Measurement Unit
10 . . . Sample
11 . . . Sample Table
12 . . . Scanner
121 . . . X-Y Scanner
122 . . . Z Scanner
15 . . . Cantilever
16 . . . Probe
17 . . . Optical Displacement Detector
171 . . . Laser Beam Source
172 . . . Half Mirror
173 . . . Mirror
174 . . . Photodetector
175 . . . Displacement Amount Calculator
2 . . . Control and Processing Unit
3 . . . Measurement Controller
4 . . . Data Processor
40 . . . Storage
41 . . . Feature Amount Calculator
42 . . . Feature Amount Selector
43 . . . Two-dimensional Mapping image Display Unit
44 . . . Biaxial Data Display Unit
45 . . . Magnification Display Unit
46 . . . Two-dimensional Data Display Unit
5 . . . Input Unit
6 . . . Display Unit

The invention claimed is:

1. A data processing device for a scanning probe microscope, the data processing device processing biaxial data indicating a change in a second physical quantity with respect to a change in a first physical quantity, the biaxial data being acquired for each of a plurality of measurement points on a sample surface by scanning the sample surface with a probe using a scanning probe microscope, the data processing device comprising:
   a) a feature amount calculator that acquires one or a plurality of types of feature amounts from the biaxial data at each of the plurality of measurement points;
   b) a feature amount selector that causes a user to select one of the one or the plurality of types of feature amounts;
   c) a two-dimensional mapping image display unit that displays the feature amount at each of the plurality of measurement points on a screen as a two-dimensional mapping image with each measurement point as one pixel based on selection of the feature amount by the user; and
   d) a biaxial data display unit that, when the user selects one of the pixels in the two-dimensional mapping image, displays on the screen the selected pixel and the biaxial data of the measurement point corresponding to one or a plurality of pixels adjacent to the selected pixel.

2. The data processing device for a scanning probe microscope according to claim 1, further comprising
   e) an magnification display unit that, when the user selects one or a plurality of pieces of biaxial data displayed on the screen, magnifies and displays the selected biaxial data.

3. The data processing device for a scanning probe microscope according to claim 2, wherein when the user selects the plurality of pieces of biaxial data, the magnification display unit displays a position on the two-dimensional mapping image, the position corresponding to each of the plurality of pieces of biaxial data.

4. The data processing device for a scanning probe microscope according to claim 1, further comprising
   f) a two-dimensional data display unit that, when the user selects two pixels in the two-dimensional mapping image, produces data in which a value of the second physical quantities are represented within a two-dimensional area in a visually distinguishable manner, in which one axis is defined as a position on the line segment connecting two points of the selected two pixels and another one axis is defined as a value of the first physical quantity, and displays the two-dimensional data on the screen with a position on the line segment connecting two points of the selected two pixels as one axis.

* * * * *